United States Patent
Oami et al.

(10) Patent No.: US 9,118,889 B2
(45) Date of Patent: Aug. 25, 2015

(54) VIDEO SIGNATURE EXTRACTION DEVICE

(71) Applicant: NEC CORPORATION, Tokyo (JP)

(72) Inventors: Ryoma Oami, Tokyo (JP); Kota Iwamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 353 days.

(21) Appl. No.: 13/676,926

(22) Filed: Nov. 14, 2012

(65) Prior Publication Data

US 2013/0070847 A1 Mar. 21, 2013

Related U.S. Application Data

(62) Division of application No. 13/056,773, filed as application No. PCT/JP2010/000278 on Jan. 20, 2010, now Pat. No. 8,335,251.

(30) Foreign Application Priority Data

Jan. 23, 2009 (JP) ................................ 2009-012815

(51) Int. Cl.
*H04N 7/12* (2006.01)
*G06K 9/46* (2006.01)
(Continued)

(52) U.S. Cl.
CPC .......... *H04N 19/00* (2013.01); *G06F 17/30256* (2013.01); *G06F 17/30799* (2013.01);
(Continued)

(58) Field of Classification Search
USPC ..................... 382/195, 282, 239; 348/416, 1; 375/240.24, 240.08, 9
See application file for complete search history.

(56) References Cited

U.S. PATENT DOCUMENTS 5,592,228 A * 1/1997 Dachiku et al. ............. 348/416.1
6,792,152 B1 * 9/2004 Shibata et al. ................ 382/239
(Continued)

FOREIGN PATENT DOCUMENTS

CN 101340551 A 1/2009
JP 2000-194727 A 7/2000
(Continued)

OTHER PUBLICATIONS

Lian Lu, "Video fingerprinting for copy identification: from research to industry applications", Proceedings of SPIE, The International Society for Optical Engineering SPIE, USA, vol. 7254, Jan. 19, 2009, pp. 725402-1-725402-15, XP008127837, ISSN: 0277-786X, DOI: DOI:10.1117/12.805709.

(Continued)

*Primary Examiner* — Gims Philippe
(74) *Attorney, Agent, or Firm* — Sughrue Mion, PLLC

(57) ABSTRACT

A video signature extraction device includes an each-picture feature extraction unit which extracts a feature of each picture, which is a frame or a field, as an each-picture visual feature from an input video; a time axial direction change region extraction unit which analyzes an image change in a time direction with respect to predetermined regions in a picture from the video, obtains a region having a large image change, and generates change region information which is information designating the region; an each-region feature extraction unit which extracts a feature of the region corresponding to the change region information as an each-region visual feature from the video; and a multiplexing unit which multiplexes the each-picture visual feature, the each-region visual feature, and the change region information, and generates a video signature.

5 Claims, 14 Drawing Sheets

(51) Int. Cl.
  *H04N 19/00* (2014.01)
  *G06F 17/30* (2006.01)
  *G06K 9/00* (2006.01)
  *G06T 7/20* (2006.01)
  *H04N 5/14* (2006.01)
  *H04N 21/44* (2011.01)
  *H04N 21/8352* (2011.01)

(52) U.S. Cl.
  CPC ...... *G06F17/30811* (2013.01); *G06K 9/00744* (2013.01); *G06K 9/46* (2013.01); *G06T 7/2053* (2013.01); *H04N 5/14* (2013.01); *H04N 21/44008* (2013.01); *H04N 21/8352* (2013.01); *G06T 2207/10016* (2013.01)

(56) References Cited

U.S. PATENT DOCUMENTS

| | | | |
|---|---|---|---|
| 7,092,040 | B1 | 8/2006 | Watanabe |
| 2002/0106127 | A1* | 8/2002 | Kodama et al. ............... 382/195 |
| 2003/0202715 | A1* | 10/2003 | Kinjo ........................... 382/282 |
| 2007/0253594 | A1 | 11/2007 | Lu et al. |
| 2008/0033898 | A1 | 2/2008 | Hashimoto |
| 2009/0049103 | A1 | 2/2009 | Takahashi et al. |

FOREIGN PATENT DOCUMENTS

| | | |
|---|---|---|
| JP | 2006-054802 A | 2/2006 |
| JP | 2008-040682 A | 2/2008 |

OTHER PUBLICATIONS

Law-To, et al., "Video Copy Detection: a Comparative Study", CIVR '07 Proceedings of the 6th ACM International Conference on Image and Video Retrieval, ACM, Jul. 9, 2007, pp. 371-378, XP55003749, New York, NY, USA, ISBN: 978-1-59-593733-9.

Kim, et al., "Spatiotemporal Sequence Matching for Efficient Video Copy Detection", IEEE Transactions on Circuits and Systems for Video Technology, IEEE Service Center, Piscataway, NJ, US, vol. 15, No. 1, Jan. 1, 2005, pp. 127-132, XP011124674, ISSN: 1051-8215, DOI: DOI: 10.1109/TCSVT.2004.836751.

Dimitrova, et al, "Content-Based Video Retrieval by Example Video Clip", Proceedings of SPIE, The International Society for Optical Engineering SPIE, USA, vol. 3022, Jan. 1, 1997, pp. 59-70, XP000923334, ISSN: 0277-786X, DOI: DOI:10.1117/12.263444.

International Search Report for PCT/JP2010000278 dated Apr. 27, 2010.

Kota Iwamoto, et al., "Image Signature Robust to Caption Superimposition for Video Sequence Identification", Proceedings of International Conference on Image Processing (ICIP2006) 2006, pp. 3185-3188.

Eiji Kasutani, et al., "Video Material Archive System for Efficient Video Editing Based on Media Identification", IEEE International Conference on Multimedia and Expo (ICME), 2004, pp. 727-730.

Chinese Office Action issued Dec. 4, 2012 in corresponding Chinese Patent Application No. 201080005313.6.

* cited by examiner

| 1 | 2 | 3 | 4 |
|---|---|---|---|
| 5 | 6 | 7 | 8 |
| 9 | 10 | 11 | 12 |
| 13 | 14 | 15 | 16 |

BLOCK WITH CHANGE IN TIME AXIAL DIRECTION

FIG. 5
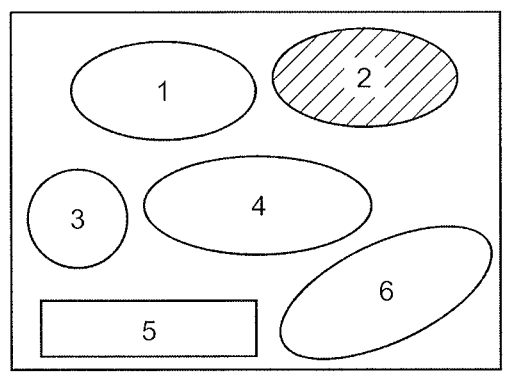
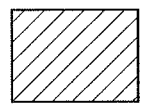 LOCAL REGION WITH CHANGE IN TIME
AXIAL DIRECTION

T-1 FRAME　　　T FRAME　　MOTION VECTOR
　　　　　　　　　　　　　CALCULATION
　　　　　　　　　　　　　　RESULT

| 1 | 2 | 3 | 4 |
| --- | --- | --- | --- |
| 5 | 6 | 7 | 8 |
| 9 | 10 | 11 | 12 |
| 13 | 14 | 15 | 16 |

▨ BLOCK WITH CHANGE IN TIME AXIAL DIRECTION

VIDEO SIGNATURE EXTRACTION DEVICE

CROSS REFERENCE TO RELATED APPLICATIONS

This application is a Divisional of U.S. patent application Ser. No. 13/056,773, filed Jan. 31, 2011, which is a National Stage of International Application No. PCT/JP2010/000278, filed Jan. 20, 2010, claiming priority based on Japanese Patent Application No. 2009-012815, filed Jan. 23, 2009, the contents of all of which are incorporated herein by reference in their entirety.

TECHNICAL FIELD

The present invention relates to video signature extraction devices, video signature extraction methods, and video signature extraction programs, for retrieving videos, which are capable of detecting similar or identical moving image segments among a plurality of moving images.

BACKGROUND ART

An exemplary device for extracting and matching features of moving images is described in Non-Patent Document 1. FIG. 14 is a block diagram showing the device described in Non-Patent Document 1.

A block unit feature extraction unit 1000 extracts features in block units from a first video to be input, and outputs a first feature to a matching unit 1030. Another block unit feature extraction unit 1010 extracts features in block units from a second video to be input, and outputs a second feature to the matching unit 1030. A weighting coefficient calculation unit 1020 calculates a weighting value of each of the blocks based on a learning video to be input, and outputs a weighting coefficient to the matching unit 1030. The matching unit 1030 compares the first feature output from the block unit feature extraction unit 1000 with the second feature output from the block unit feature extraction unit 1010 using the weighting coefficient output from the weighting coefficient calculation unit 1020, and outputs a matching result.

Next, operation of the device shown in FIG. 14 will be described.

The block unit feature extraction unit 1000 divides each of the frames of the input first video into blocks, and calculates a feature for identifying the video from each block. Specifically, the block unit feature extraction unit 1000 determines the type of the edge for each block, and calculates the type as a feature of each block. Then, for each of the frames, the block unit feature extraction unit 1000 forms a feature vector configured of the edge types of the respective blocks. Then, the block unit feature extraction unit 1000 calculates the feature vector of each of the frames, and outputs the acquired feature to the matching unit 1030 as the first feature.

Operation of the block unit feature extraction unit 1010 is similar to that of the block unit feature extraction unit 1000. The block unit feature extraction unit 1010 calculates the second feature from the input second video, and outputs the acquired second feature to the matching unit 1030.

On the other hand, the weighting coefficient calculation unit 1020 calculates probability that a caption is inserted in each block of a frame beforehand, using a learning video. Then, based on the calculated probability, the weighting coefficient calculation unit 1020 calculates a weighting coefficient of each block. Specifically, a weighting coefficient is calculated such that weighting becomes high as the probability of a caption being superposed is low, in order to improve robustness to caption superposition. The acquired weighting coefficient is output to the matching unit 1030.

The matching unit 1030 compares the first feature output from the block unit feature extraction unit 1000 with the second feature output from the block unit feature extraction unit 1010, using the weighting coefficient output from the weighting coefficient calculation unit 1020. Specifically, the matching unit 1030 compares the features of the blocks at the same position in the two frames, and calculates a score of the block unit such that the score is 1 if they are the same, and the score is 0 if they are not the same. The matching unit 1030 sums the acquired scores of the block units by weighting them with use of the weighting coefficients, and calculates a matching score (similarity of a frame unit) of the frame. The matching unit 1030 performs these processes on the respective frames to thereby acquire a matching result between the first video and the second video.

Through these processes, it is possible to perform matching of moving images while reducing influences of caption superposition in portions where the influences may be large, and to achieve high matching accuracy even with caption superposition.

Patent Document 1 describes a device for retrieving moving images, using features of images such as mean values in block units or DCT coefficients and motion vector information obtained between previous and next frames. In the moving image retrieval device of Patent Document 1, first, at least one of values of physical moving image feature information including luminance, color difference information, and color information of each frame, a mean value thereof, the sum of the values, or a difference value thereof, is extracted from the input image with respect to each frame. Then, the extracted values are aligned on a time axis, and all values in the alignment or values extracted from the alignment in certain intervals or irregular intervals are extracted as moving image feature information. Alternatively, it is also possible to extract a DCT coefficient and motion compensation information of a frame from compressed moving image data, and obtain a mean value of DCT coefficients, a sum value thereof, or a difference value of the values, and from the motion compensation information, obtain at least one of a motion vector, an average motion vector between previous and next frames, a sum motion vector, a difference vector, a motion vector of the frame as a whole, and the like. Then, the obtained values are aligned on a time axis, and all values in the alignment or values extracted from the alignment in certain intervals or irregular intervals are extracted as moving image feature information.

PRIOR ART DOCUMENTS

Patent Document

Patent Document 1: Japanese Unexamined Patent Publication No. 2000-194727

Non-Patent Documents

Non-Patent Document 1: Kota Iwamoto, Eiji Kasutani, Akio Yamada, "Image Signature Robust to Caption Superimposition for Video Sequence Identification", Proceedings of International Conference on Image Processing (ICIP2006), 2006

Non-Patent Document 2: Eiji Kasutani, Ryoma Oami, Akio Yamada, Takami Sato, and Kyoji Hirata, "Video Material Archive System for Efficient Video Editing Based on Media Identification", Proceedings of International Conference on Multimedia and Expo (ICME2004), pp. 727-730, 2004

SUMMARY OF THE INVENTION

Problems to be Solved by the Invention

A problem involved in the above art is that it is difficult to improve the discrimination accuracy in a time direction in scenes having less temporal changes. In the case of Non-Patent Document 1, as the weighting at the time of matching is determined by the probability of caption superposition, control is not focused on matching of scenes having less temporal changes. In scenes having less temporal changes, it is often the case that the screen image seldom moves, and that changes in the image such as motion and brightness changes are caused only in a local area. In order to improve the discrimination accuracy in that case, although it is only necessary to extract features in more detail, including extracting features in block units, this causes a problem of an increase in the feature size. Even in the case of Patent Document 1, although motion information is used and so motion is taken into account in features, features obtained from motion information and features obtained from luminance values and DCT coefficients are used independent from each other. As such, if extraction is performed to a more detailed level, a problem of an increase in the feature size, which is the same as that involved in Non-Patent Document 1, will also be caused.

Object of the Invention

An object of the present invention is to provide a video signature extraction device capable of solving a problem of low discrimination capability of video signatures generated from moving images having less temporal changes.

Means for Solving the Problems

A video signature extraction device, according to an aspect of the present invention, includes an each-picture feature extraction unit which extracts a feature of each picture, which is a frame or a field, as an each-picture visual feature from an input video; a time axial direction change region extraction unit which analyzes an image change in a time direction with respect to predetermined regions in a picture from the video, obtains a region having a large image change, and generates change region information which is information designating the region; an each-region feature extraction unit which extracts a feature of the region corresponding to the change region information as an each-region visual feature from the video; and a multiplexing unit which multiplexes the each-picture visual feature, the each-region visual feature, and the change region information, and generates a video signature.

Effects of the Invention

As the present invention is configured as described above, the present invention is able to achieve an advantageous effect of improving the discrimination accuracy in a time direction even in scenes having less temporal changes.

BRIEF DESCRIPTION OF THE DRAWINGS

FIG. 5 is an illustration showing a case where a plurality of predetermined regions in a picture are local regions in different shapes.

DESCRIPTION OF EMBODIMENTS

Next, best modes for carrying out the invention will be described in detail with reference to the drawings.

Figure 1:
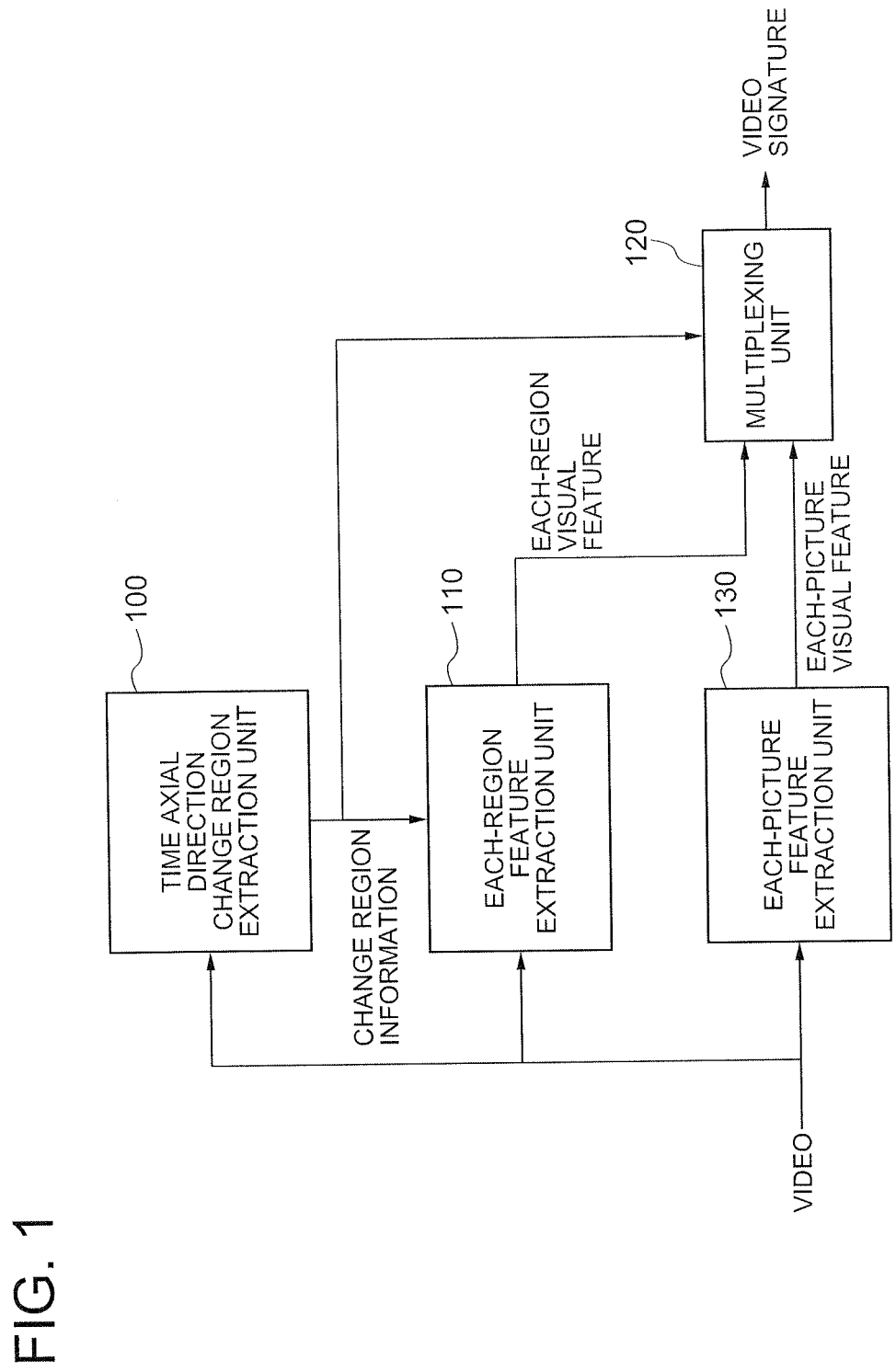
FIG. 1 is a region diagram showing a first embodiment of an image signature extraction device according to the present invention.

Referring to FIG. 1 showing an image signature extraction device according to a first embodiment of the present invention, the image signature extraction device includes a time axial direction change region extraction unit 100, an each-region feature extraction unit 110, an each-picture feature extraction unit 130, and a multiplexing unit 120.

The each-picture feature extraction unit 130 extracts an each-picture feature from an input video, and outputs it to the multiplexing unit 120. The time axial direction change region extraction unit 100 obtains change region information from the video, and outputs it to the each-region feature extraction unit 110 and to the multiplexing unit 120. The each-region feature extraction unit 110 extracts an each-region visual feature from the video based on the change region information output from the time axial direction change region extraction unit 100, and outputs it to the multiplexing unit 120. The multiplexing unit 120 multiplexes the each-picture visual feature output from the each-picture feature extraction unit 130, the change region information output from the time axial direction change region extraction unit 100, and the each-region visual feature output from the each-region feature extraction unit 110, and generates and outputs a video signature.

It should be noted that the video signature extraction device of the present embodiment can be realized by a computer in the following manner, for example. A disk or a semiconductor memory, storing programs for allowing a computer to function as the video signature extraction device is prepared, and the computer is caused to read the program. The computer controls the operation of itself according to the readout program to thereby realize the time axial direction change region extraction unit 100, the each-region feature extraction unit 110, the multiplexing unit 120, and the each-picture feature extraction unit 130 on the self computer.

Next, operation of the first embodiment shown in FIG. 1 will be described in detail.

First, a video is input to the each-picture feature extraction unit 130. If the original video is coded, the video is first decoded by a decoder, and then the data is input in picture units composed of frames or fields.

The each-picture feature extraction unit 130 calculates a feature vector of each picture. The each-picture feature extraction unit 130 considers a picture as one still image, and extracts a vector of a visual feature indicating features such as colors, patterns, shapes, and the like of this picture. As the feature, it is possible to use a feature vector which is obtained by calculating a difference between features of regions with respect to a pair of local regions corresponding to each dimension of the feature vector (for example, calculating a mean value of pixel value within a region with respect to each region of a pair of regions and obtaining a difference in mean values between regions), and using a quantized value obtained by quantizing the difference as a value of each dimension. The feature vector, calculated for each picture, is output to the multiplexing unit 120 as an each-picture visual feature.

Figure 4:
FIG. 4 is an illustration showing a case where a plurality of predetermined regions in a picture are blocks.

Further, the video is also input to the time axial direction change region extraction unit 100. In the time axial direction change region extraction unit 100, an amount of change of the image in a time direction is calculated. An amount of change in each of the predetermined regions in the picture is calculated using a current target picture and the previous and next pictures. Then, a region where the amount of change is relatively large in the screen image is obtained. Regions for obtaining the amounts of change are formed by dividing a picture. The regions may be a plurality of blocks as shown in FIG. 4, or a plurality of local regions having different shapes as shown in FIG. 5. Further, the shape of the blocks is not limited to rectangle. As a region having a larger change in a time direction has a larger possibility of contributing to discrimination of a video, a plurality of regions are selected in order in which a region having a largest amount of change is the first. Selection may be performed by selecting a certain number of regions in descending order, or selecting regions in which the amount of change is a threshold or larger. The details of calculating the amount of change will be described below. Information for specifying the selected regions such as index information of the selected regions is output as change region information. For example, in a scene where an anchor person speaks in a news program, there is a case where no motion is generated in areas other than an area around the face of the anchor person. In that case, as a change in a time direction in the region corresponding to the face of the anchor person becomes relatively larger than changes in other regions in the screen image, information designating the region corresponding to the face is output as change region information.

It should be noted that the change region information may be calculated for each picture, or calculated for several pictures in a lump, and output. For example, if a portion with motion within a shot is limited to a particular region, it is possible to calculate and output change region information which is common to the entire shot. More specifically, it is possible that change region information, obtained for one picture within a shot, is also used for another picture in the shot. It is also possible to calculate time axial direction changes for all or a plurality of pictures within a shot and, with use of a representative value thereof (mean, median, or the like), obtain and describe change region information for the entire shot and use it for all pictures within the shot.

However, units for outputting change region information are not limited to shots, and change region information may be output in fixed time intervals such as every several pictures. It is also possible to calculate a time segment, to which the same change region information is applicable, from the amount of change in a time direction, and calculate and output the change region information in a lump with respect to the pictures included in the time segment. In that case, as the number of pictures put together varies each time, the number of pictures is also described together. A time segment to which the same change region information is applicable is able to be calculated by applying threshold processing on variation of the amount of change in the time direction between pictures. As such, an amount of change in the time axial direction in the head picture in a time segment and an amount of change in the time axial direction in the current picture are compared, and if the degree of change exceeds a threshold, a segment up to the previous picture is considered as one group, whereby change region information with respect to the segment is calculated. The change region information with respect to that segment may be used as change region information of any picture in the segment or a representative value of change region information of the pictures in the segment. Through these processes, regardless of a processing target video, the amount of information of the change region information can be reduced while keeping high descrimination accuracy in the time direction.

The change region information calculated as described above is output to the each-region feature extraction unit 110 and to the multiplexing unit 120.

The each-region feature extraction unit 110 extracts a feature in a region unit with respect to a region specified by the change region information output from the time axial direction change region extraction unit 100. In this process, the feature in a region unit may be the same as, or different from, the feature of the entire screen image calculated by the each-picture feature extraction unit 130. For example, it is possible to use a feature in which, with respect to the above-described pair of local regions corresponding to each dimension of the feature vector, a feature difference between the regions is calculated and used as each dimensional value of the feature vector. The feature of the region designated by the change region information is output to the multiplexing unit 120 as an each-region visual feature.

The multiplexing unit 120 multiplexes the each-picture visual feature output from the each-picture feature extraction unit 130, the each-region visual feature output from the each-picture feature extraction unit 110, and the change region information output from the time axial direction change region extraction unit 100, and generates and outputs a video signature. In this embodiment, the multiplexing unit 120 generates a video signature by multiplexing them in such a manner that these pieces of information can be separated at the time of matching. As multiplexing methods, it is possible to multiplex three pieces of information for each picture by interleaving them, or separately put together each of the each-picture visual feature, the each-region visual feature, and the change region information and finally connect them to thereby multiplex them, or multiplex the each-picture visual feature, the each-region visual feature, and the change region information for each predetermined segment (for example, by a time segment unit for calculating change region information).

Next, an embodiment of the time axial direction change region extraction unit 100 will be described with reference to FIG. 2.

Figure 2:
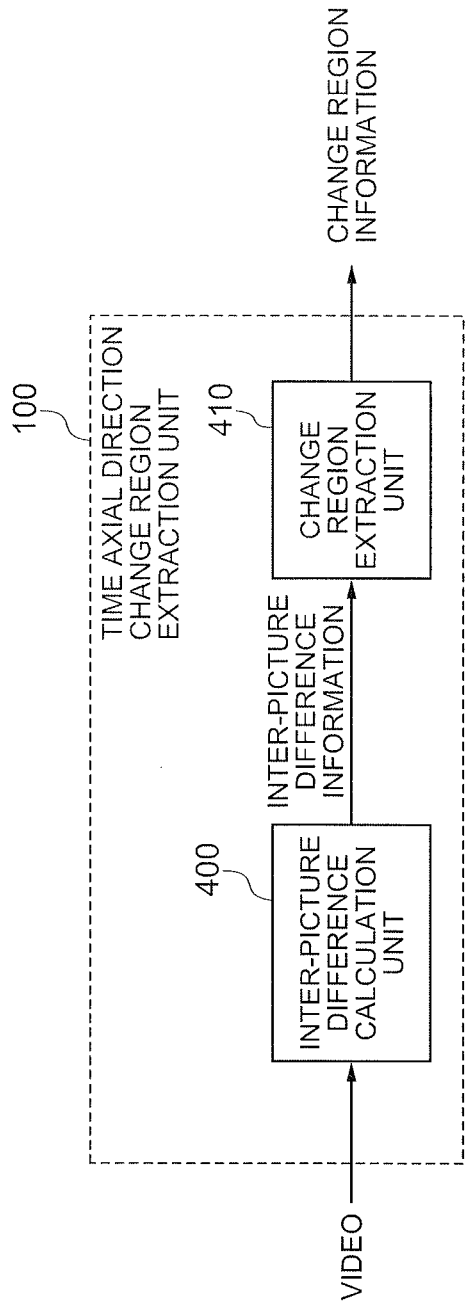
FIG. 2 is a block diagram showing an exemplary configuration of a time axial direction change region extraction unit 100.

Referring to FIG. 2 showing an embodiment of the time axial direction change region extraction unit 100, the time axial direction change region extraction unit 100 includes an inter-picture difference calculation unit 400 and a change region extraction unit 410.

The inter-picture difference calculation unit 400 calculates inter-picture difference information from the input video, and outputs it to the change region extraction unit 410. The change region extraction unit 410 calculates change region information using the inter-picture difference information output from the inter-picture difference calculation unit 400 and a feature extraction parameter (information describing each dimension of the feature and the extraction target region), and outputs it.

Next, operation of the time axial direction change region extraction unit 100 shown in FIG. 2 will be described.

First, a video is input to the inter-picture difference calculation unit 400. The inter-picture difference calculation unit 400 calculates a difference in pixel value between pictures. Calculation of a difference may be performed for each pixel unit or performed for a region for which calculation for some pixels can be made at once (for example, a block). For example, a method in which a representative value (mean, median, etc.) with respect to each region is obtained beforehand, and then, a difference with a representative value of a region at the same location is obtained between pictures. Further, a difference between pixel values may be a difference between luminance values. It is also possible to use color components of R, G, and B as pixel values, and calculate a difference of at least one of them to use as a difference of the pixel value. Of course, a color space may be any color space such as HSV or L*a*b*, rather than RGB. Further, as a difference, it is possible to obtain an absolute value of a difference by performing absolute value computation, rather than simply subtracting a pixel value. The calculated difference data between the pictures is output to the change region extraction unit 410 as inter-picture difference information.

The change region extraction unit 410 calculates difference information of each region from the inter-picture difference information. In order to do so, first, in the processing target picture, a value to be incremented in a region corresponding to a moving object is calculated. This is achieved by obtaining a product of a difference value between the processing target picture and the previous picture, and a difference value between the processing target picture and the next picture.

Figure 3:
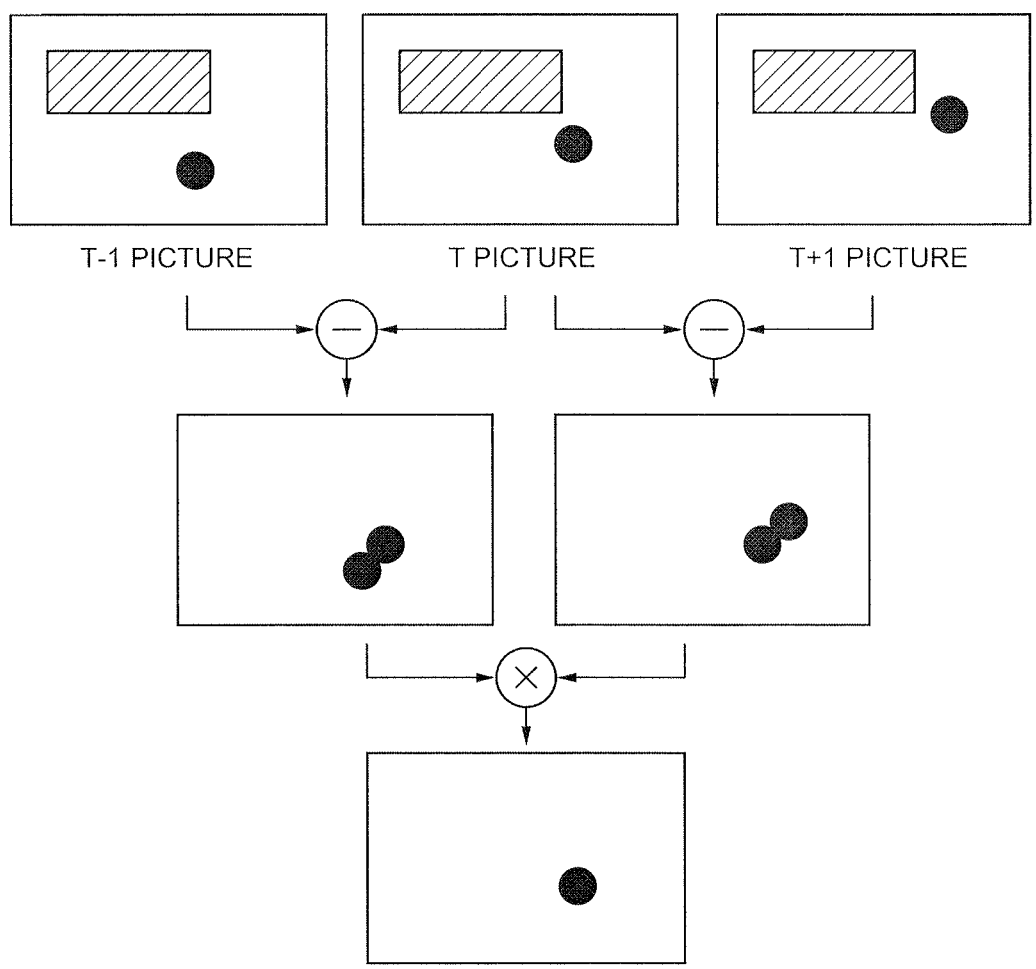
FIG. 3 is an illustration for explaining an exemplary process performed by a change region extraction unit 410.

This is shown in FIG. 3. In FIG. 3, a T picture represents a processing target picture, a T−1 picture represents the previous picture, and a T+1 picture represents the next picture. In these pictures, it is assumed that a rectangle shaded object remains stationary, and only a round black object moves. In this case, the inter-picture difference calculation unit 400 has calculated a difference between the processing target T picture and the previous T−1 picture. In this case, a difference is only generated by the movement of the round object, as shown in FIG. 3. However, the difference value itself tends to become larger at both location of the round object in the T picture and location of the object in the T−1 picture. Similarly, a difference between the next T+1 picture and the T picture becomes larger at both location of the round object in the T picture and location of the round object in the T+1 picture. Then, a product of both difference images is calculated. As it is only the position of the round object in the T picture where the difference value becomes larger in both difference images, it is possible to increase only the difference in the moving object region in the T picture. Although a method of calculation using the previous and next pictures of the processing target picture has been described in this embodiment, calculation can also be performed in the same manner using pictures of a few pictures before and a few pictures after. As such, it is possible to increase only the difference in the moving object region in the same manner using a T−m picture and a T+n picture. By collecting the results obtained in this way by each region, the amount of change in the region is calculated.

More specifically, the amount of change in a region is calculated according to the following Expression 1.

$$w(i) = \sum_{x \in R(i)} |f_{T-1}(x) - f_T(x)||f_{T+1}(x) - f_T(x)| \quad \text{[Expression 1]}$$

In Expression 1, $f_T(x)$ represents a pixel value at a position x of the T picture, $R(i)$ represents the $i^{th}$ region (a group of pixels), and $w(i)$ represents the amount of change in the $i^{th}$ region. Although simple addition in a region is used in this embodiment, it is also possible to calculate the amount of change in a region by obtaining an average within a region, using a square for addition, or using another statistic such as a median or a maximum value. Further, it is also possible to calculate the amount of change by not using the values of all pixels in a region. For example, the amount of change can be calculated by using every other pixel.

Based on the amounts of change with respect to respective regions calculated in this manner, a region having a large amount of change is obtained. Specifically, it is possible to calculate regions in which the amount of change exceeds a certain threshold, or select a certain number of regions in descending order of amount of change. Then, information describing the selected regions (e.g., indexes of regions) is output as change region information. For example, in the case where the regions defined on the picture are blocks obtained by dividing the screen image into sixteen pieces as shown in FIG. 4 and the amount of change increases in the shaded blocks, the indexes 6, 10, and 12, of the blocks are output as change region information. Further, in the case where the regions defined on the picture are a plurality of local regions in random shapes as shown in FIG. 5 and the amount of change increases in the shaded local region, the index 2 of the local region is output as change region information.

Further, the change region information is not necessary calculated for all pictures, and may be calculated for every other picture. In that case, it is possible to sum the amounts of change with respect to the regions calculated in a plurality of pictures to obtain change region information corresponding to the pictures.

If the feature in the entire image largely changes temporality, as it is possible to perform matching without features in region units, it is not necessary to calculate a feature of each region (block or local region) with respect to such a video or a video segment. For example, if the number of regions having small amount of change in a time axial direction is not more than a certain threshold, a feature is not calculated for each block or local region. Specifically, nothing is output as change region information, or change region information includes information indicating that there is no feature extraction target region.

Thereby, it is possible to avoid calculating unnecessary region features so as to prevent the size of video features from being increased to an unnecessary level, whereby features can be calculated only from necessary portions.

As the time axial direction change region extraction unit 100 shown in FIG. 2 is only necessary to obtain a difference between pictures basically, a processing load can be suppressed.

Next, another embodiment of the time axial direction change region extraction unit 100 will be described with reference to FIG. 6.

Figure 6:
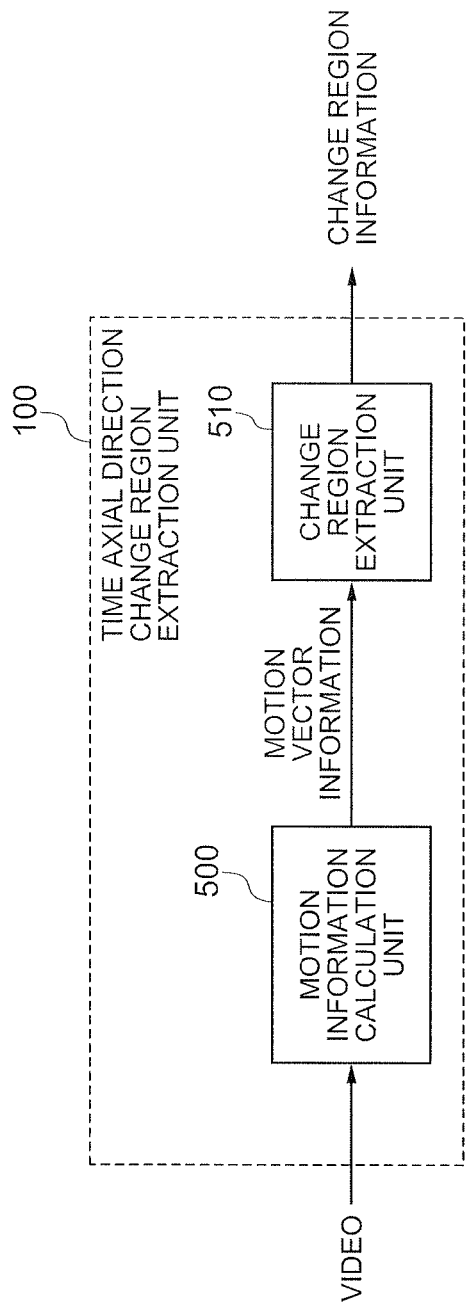
FIG. 6 is a block diagram showing another exemplary configuration of the time axial direction change region extraction unit 100.

Referring to FIG. 6 showing another embodiment of the time axial direction change region extraction unit 100, the time axial direction change region extraction unit 100 includes a motion information calculation unit 500 and a change region extraction unit 510.

The motion information calculation unit 500 receives a video, calculates a motion vector, and outputs motion vector information to the change region extraction unit 510. The change region extraction unit 510 calculates change region information using the motion vector information output from the motion information calculation unit 500 and a feature extraction parameter, and outputs it.

Next, operation of the time axial direction change region extraction unit 100 shown in FIG. 6 will be described.

First, a video is input to the motion information calculation unit 500. The motion information calculation unit 500 performs motion estimation between the current target picture and the previous (or next) picture to calculate a motion vector. As a method of calculation a motion vector, any vector estimation methods including a method based on a conventional gradient method and a method based on a block matching method may be used. Further, motion may be calculated in pixel units, or it is also possible to divide an image into a plurality of small regions and motion may be calculated for the small region units. Information describing the location of the motion vector calculated in this manner is output as motion vector information. The motion vector information may be information directly describing each motion vector calculated within the picture, or information describing motion only in a region where a motion vector other than 0 is calculated, together with information specifying the region. The calculated motion vector describing information is output to the change region extraction unit 510.

The change region extraction unit 510 collects the calculated motion vectors for each region, and calculates the amount of motion within the region.

Figure 7:
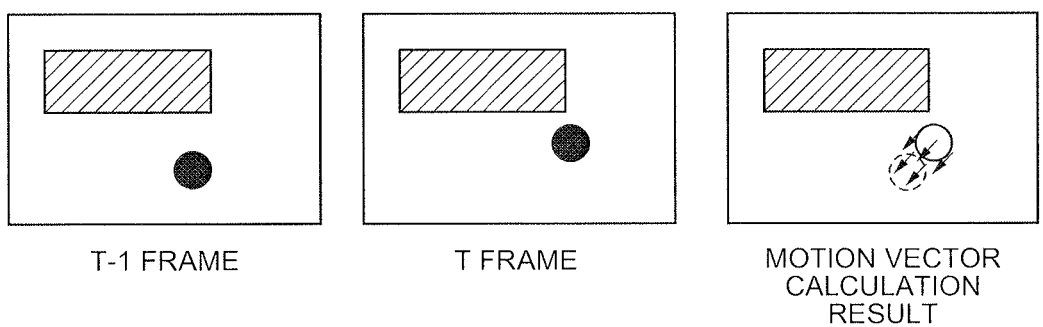
FIG. 7 is an illustration for explaining an exemplary process performed by a change region extraction unit 510.

This is shown in FIG. 7. FIG. 7 shows the states of the T picture and the T−1 picture. By performing motion estimation processing on these pictures, a motion vector is calculated in a portion corresponding to the motion of the round object. Although the case of using an immediately previous picture has been described in this example, it is possible to perform motion estimation processing using a picture of some pictures ago or some pictures after. Further, it is also possible to perform motion estimation processing using a several number of pictures, rather than using only two pictures. Even in that case, a motion picture is also calculated in a portion with motion. By using this motion vector, the amount of motion within each region is calculated. For example, the sum of the lengths of the motion vectors is calculated within a region, which is represented by Expression 2.

$$w(i) = \sum_{x \in R(i)} |v(x)|$$ [Expression 2]

In Expression 2, v(x) represents a motion vector at x. The other signs are the same as those used in Expression 1. Although simple addition in a region is used in this embodiment, it is also possible to obtain a representative amount of motion in a region by obtaining an average within a region, using a square for addition, or using another statistic such as a median or a maximum value. Further, it is also possible to calculate the amount of motion by not using the all motion vectors in a region. For example, the amount of motion can be calculated by thinning appropriately.

As the time axial direction change region extraction unit 100 shown in FIG. 6 calculates motion, the amount of processing increases in general, compared with the case shown in FIG. 2. However, as actual motion is calculated, a region having motion in a time direction can be obtained with higher accuracy, compared with the case shown in FIG. 2.

Next, an embodiment of the video signature matching device of the present invention will be described.

Figure 8:
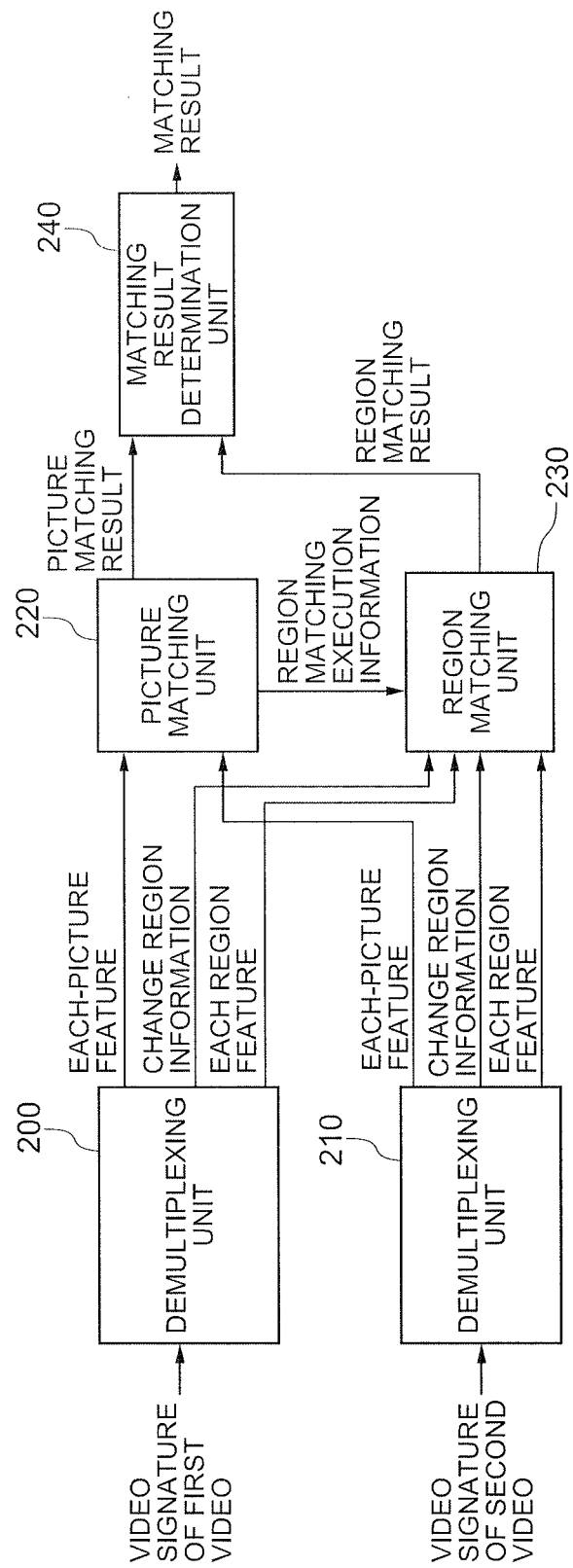
FIG. 8 is a block diagram showing an exemplary configuration of a video signature matching device for matching video signatures generated by the video signature extraction device of the first embodiment.

Referring to FIG. 8 showing an embodiment of the video signature matching device, the video signature matching device includes a demultiplexing unit 200, another demultiplexing unit 210, a picture matching unit 220, a region matching unit 230, and a matching result determination unit 240. It should be noted that this embodiment of the video signature matching device can be realized by a computer which is controllable by programs.

The demultiplexing unit 200 demultiplexes an input first video signature, and outputs a first each-picture visual feature to the picture matching unit 220 and outputs a first each-region visual feature and first change region information to the region matching unit 230. Similarly, the demultiplexing unit 210 also demultiplexes an input second video signature, and outputs a second each-picture visual feature to the picture matching unit 220 and outputs a second each-region visual feature and second change region information to the region matching unit 230. The picture matching unit 220 compares the first each-picture visual feature output from the demultiplexing unit 220 with the second each-picture visual feature output from the demultiplexing unit 210, and outputs a picture matching result to the matching result determination unit 240, and also outputs region matching execution information to the region matching unit 230. Based on the region matching execution information output from the picture matching unit 220, the first change region information output from the demultiplexing unit 200, and the second change region information output from the demultiplexing unit 210, the region matching unit 230 compares the first each-region visual feature output from the demultiplexing unit 200 with the second each-region visual feature output from the demultiplexing unit 210, and outputs a region matching result to the matching result determination unit 240. The matching result determination unit 240 calculates a matching result from the picture matching result output from the picture matching unit 220 and the region matching result output from the region matching unit 230, and outputs it.

Next, operation of the embodiment of the video signature matching device according to the present invention shown in FIG. 8 will be described.

The first video signature is input to the demultiplexing unit 200. The demultiplexing unit 200 separates the first each-picture visual feature, the first each-region visual feature, and the first change region information, from the first video signature. In this process, separation is performed by means of a separation method corresponding to the method used for multiplexing by the multiplexing unit 120. The first each-picture visual feature generated by separation is output to the picture matching unit 220, and the first each-region feature and the first change region information are output to the region matching unit 230.

The second video signature is input to the demultiplexing unit 210. Operation of the demultiplexing unit 210 is the same as that of the demultiplexing unit 200, and the second each-picture visual feature generated by separation is output to the picture matching unit 220, and the second each-region feature and the second change region information are output to the region matching unit 230.

The picture matching unit 220 compares the first each-picture visual feature output from the demultiplexing unit 200 with the second each-picture visual feature output from the demultiplexing unit 210. They may be compared using the degree of similarity indicating similarity of both features, or using a distance indicating the level of difference between both features. In the case of comparing them using a distance, comparison will be performed according to Expression 3.

$$d = \sum_{i=1}^{N} |v_1(i) - v_2(i)| \qquad \text{[Expression 3]}$$

It should be noted that N represents the number of dimensions of the feature, and $v_1(i)$ and $v_2(i)$ respectively represent values of the $i^{th}$ dimension of the first and second each-picture visual features. By performing comparison in picture units and summing, specific segments of the first video and the second video are compared. For example, a number of pairs of pictures having distance values not more that a threshold is obtained in a comparison in picture units, and if the value is sufficiently large relative to the number of pictures included in the segment, the both videos are determined to be of the same segment, while if not, they are determined not to be of the same segment. By performing this process on combinations in arbitrary segments of the first video and the second video, all of the same segments of random length included in these videos can be determined. Instead of performing threshold processing on distances in picture units, it is also possible to perform determination according to whether or not a value obtained by summing the distances within a segment is smaller than a predetermined threshold. Of course, a mean value may be obtained, rather than a total value. Alternatively, comparison may be performed in a segment while eliminating outlier. Such comparison may be performed using a median or a result of M assumption, instead of a mean value, for example.

Figure 9:
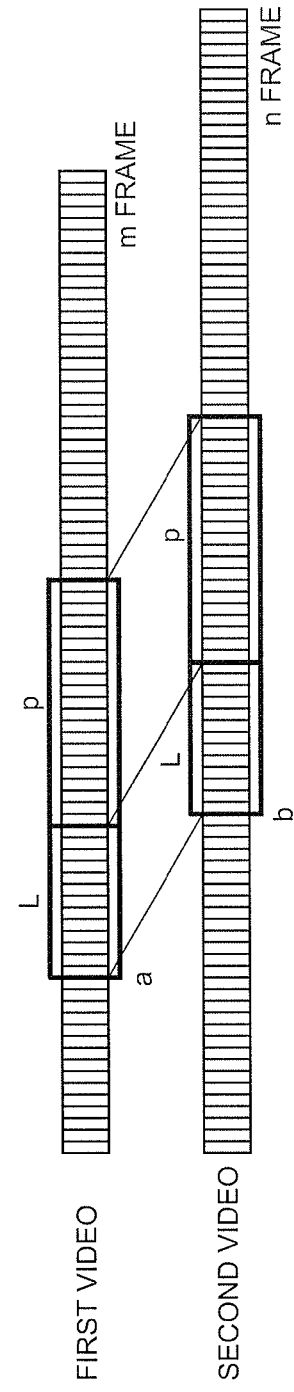
FIG. 9 is an illustration for explaining a matching process of two videos.

As a method of comparing segments of any length, the matching method described in Non-Patent Document 2 can also be used. As shown in FIG. 9, for matching between videos, a matching window having a length of L pictures is provided, and the window is caused to slide on the first video and the second video respectively, and they are compared with each other. If the segments within the matching windows are determined to be identical, the matching window is extended by a length of p pictures so as to continue the matching process. As long as both segments are determined to be identical, the process of extending the matching window by p pictures is repeated so as to obtain the identical segments with the maximum length. Thereby, the identical segments with the maximum length, in the compared segments, can be acquired effectively.

It should be noted that although the case of using a distance as a measure has been described above, comparison can also be performed using the degree of similarity. In that case, comparison is specifically performed using the degree of similarity S calculated by Expression 4.

$$S = \sum_{i=1}^{N} Sim(v_1(i), v_2(i)) \qquad \text{[Expression 4]}$$

Sim(x, y) is a function showing similarity between x and y, and the value becomes larger as the values of x and y are more similar. For example, if the distance between x and y is d(x, y), a function shown as Expression 5 can be used.

$$Sim(x, y) = \frac{1}{1 + d(x, y)} \qquad \text{[Expression 5]}$$

Alternatively, Sim(x, y) may be a function that returns 1 when x and y match, and returns 0 otherwise, as Kronecker delta. Alternatively, if an angle (cosine value) between feature vectors is used as a degree of similarity, comparison is performed based on the degree of similarity S calculated by Expression 6.

$$S = \frac{\sum_{i=1}^{N} v_1(i) v_2(i)}{\sum_{i=1}^{N} v_1(i)^2 \sum_{i=1}^{N} v_2(i)^2} \qquad \text{[Expression 6]}$$

By using the degree of similarity acquired as described above, matching can be performed in a similar manner to that of the case of distance.

Then, a matching result is output to the matching result determination unit 240. A matching result includes information specifying identical segments, such as picture numbers and time information of the identical segments. On the other hand, if there is no identical segment, information indicating such a fact is included. It is also possible that a case where nothing is included in a matching result corresponds to the case where no identical segment is present.

When matching is performed in this manner, there is a case where a video segment having less motion in a time direction corresponds to not only one segment, but to a plurality of segments of another video (including a case of matching any partial section in a series of segments). Even if a segment corresponds to one segment, there is a case where a plurality of matching candidate segments exist substantially, because there is not a large difference in distance value or degree of similarity with other candidate segments. In that case, as sufficient matching was not able to be performed in the each-picture matching, region matching execution information notifying execution of region matching is output to the region matching unit 230. In contrast, if there is no segment which can be determined to match, or if there is a large difference between the distance value or the degree of similarity of the segments which were determined to match and the distance value or the degree of similarity of other candidate segments, it is determined that matching for each region is not necessary, so that region matching execution information will not be output.

The region matching unit 230 compares the first each-region visual feature output from the demultiplexing unit 200 with the second each-region visual feature output from the demultiplexing unit 210, based on the first change region information output from the demultiplexing unit 200 and the second change region information output from the demultiplexing unit 210. However, this matching is performed according to the region matching execution information output from the picture matching unit 220. This means that if region matching execution information is not output, matching is not performed, and a region matching result is not output. When region matching execution information is output, region matching is performed. The region matching execution information also includes information specifying target video segments, that is, information regarding target segments which were not able to be narrowed down in the picture matching, and region matching is performed on those segments.

Figure 10:
FIG. 10 is an illustration for explaining a process performed by a region matching unit 230.

When performing matching, pieces of change region information are compared to check whether there are regions located at the same position. If there are no regions located at the same position, region matching is not performed. On the other hand, if there is at least one region located as the same position, each-region matching is performed on such a region. A matching method in region units is the same as the case of performing matching on the entire screen. As such, a distance between features is calculated, and if the distance is not larger than a certain threshold, the regions are determined to match each other. Alternatively, it is possible to use a degree of similarity between features, instead of a distance, and if the degree of similarity is larger than a certain threshold, the regions are determined to match each other. If there are a plurality of regions at the same position, matching is respectively performed on all of the regions. For example, in the case where change region information of one video designates a block in FIG. 4 and change region information of another video designates a block in FIG. 10, the positions of the blocks having indexes 6 and 10 are the same in both cases. As such, matching is performed on the blocks 6 and 10 to determine whether they match each other.

Similar to the case of matching between pictures, the above-described matching process is performed on regions with respect to a picture included in certain segments, and checks whether the segments match each other. In this process, although there may be a picture which cannot be compared due to inconsistency in the change region information, matching between regions is performed by eliminating such a picture from evaluation. For example, among a T picture, a T+1 picture, and a T+2 picture, if matching can be performed between the T picture and the T+2 picture but cannot be performed on the T+1 picture, only a result obtained from the T picture and the T+2 is used for determination.

Then, in the region matching process, a matching result including segments determined to match is output to the matching result determination unit 240 as a region matching result.

The matching result determination unit 240 determines and outputs a final matching result, based on the picture matching result output from the picture matching unit 220 and the region matching result output from the region matching unit 230. If there is only a picture matching result, determination is made from the picture matching result. If there are both picture matching result and region matching result, the both results are compared, and a matched segment included in both the picture matching result and the region matching result is output. If the region matching result does not include any matching segment because matching was not performed due to inconsistency in change region information, the picture matching result is directly output.

The description of the embodiment of the video signature matching device according to the present invention ends.

[Effects of First Embodiment]

According to the present embodiment, even in the case where a change in a time direction is small in the screen image as a whole and it is difficult to accurately perform position matching in the time direction, matching accuracy in the time direction can be improved by obtaining local change information and describing it compactly so as to reduce the size of the video signature. As such, even in a scene having a poor temporal change, as a feature is calculated independently for a region where changes in the image such as motion or luminous changes occur, it is possible to perform matching with high reliability using regions with motion.

Further, in the present embodiment, as an inter-picture pixel value difference is calculated between a picture for which change region information is calculated and previous and next pictures thereof, and the change region information is calculated based on the inter-picture pixel value difference, a processing load to calculate the change region information can be reduced.

Further, in the present embodiment, as motion estimation processing is performed between a picture for which change region information is calculated and previous and next pictures thereof, and the change region information is calculated based on the estimated degree of the magnitude of motion, it is possible to obtain a region including motion in a time direction with high accuracy.

Next, a second embodiment of the present invention will be described with reference to the drawings.

Figure 11:
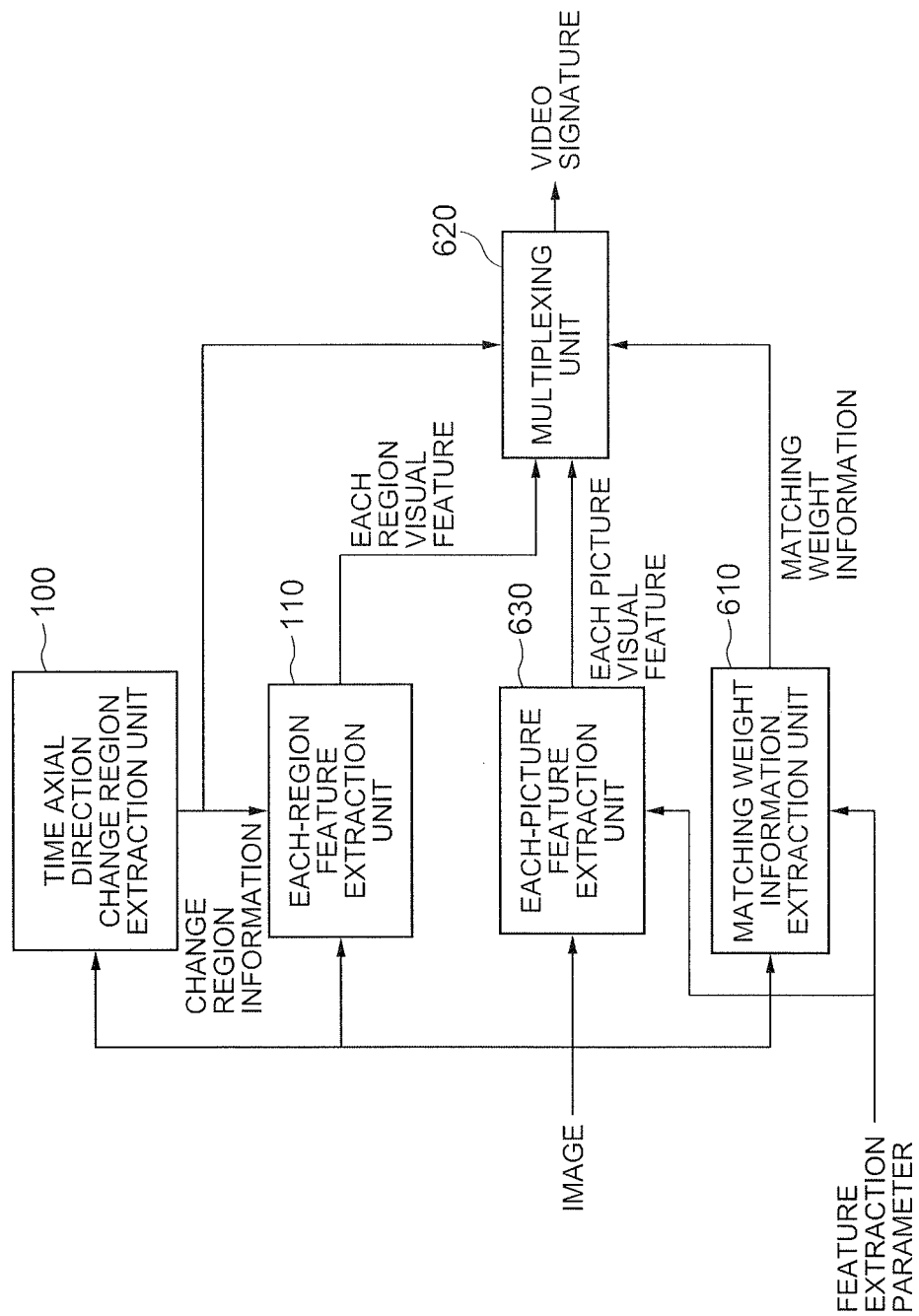
FIG. 11 is a block diagram showing a second embodiment of a video signature extraction device according to the present invention.

Referring to FIG. 11 showing a video signature extraction device according to the second embodiment of the present invention, the video signature extraction device includes the time axial direction change region extraction unit 100, the each-region feature extraction unit 110, an each-picture feature extraction unit 630, a multiplexing unit 620, and a matching weight information extraction unit 610.

The connection relationship of the time axial direction change region extraction unit 100 and the each-region feature extraction unit 110 is the same as that shown in FIG. 1. The each-picture feature extraction unit 630 receives a video and a feature extraction parameter, and outputs an each-picture visual feature to the multiplexing unit 620. The matching weight information extraction unit 610 receives a video and a feature extraction parameter, and outputs matching weight information to the multiplexing unit 620. The multiplexing unit 620 receives change region information output from the time axial direction change region extraction unit 100, an each-feature visual feature output from the each-region feature extraction unit 110, an each-picture visual feature output from the each-picture feature extraction unit 130, and matching weight information output from the matching weight information extraction unit 610, and outputs a multiplexed result as a video signature. It should be noted that the video signature extraction device of the present embodiment can be realized by a computer which is controllable by programs.

Next, operation of the second embodiment shown in FIG. 11 will be described in detail.

Operation of the time axial direction change region extraction unit 100 and operation of the each-region feature extraction unit 110 are the same as those in the case shown in FIG. 1.

Operation of the each-picture feature extraction unit 630 is also similar to that of the each-picture feature extraction unit 130, except for extracting a feature of each picture in accordance with a feature extraction parameter. However, a visual feature is not a feature obtained by converting the entire image on the screen but a feature calculated from a partial region within the screen image. As such, it is assumed that each dimension of a feature vector corresponds to a particular region within the screen image by a feature extraction parameter and that a value of a feature extracted from the region is stored. For example, each dimension of a feature vector is assumed to be a feature extracted from each block formed by dividing the screen image into blocks. A value of each dimension of a feature may be obtained from a predetermined region in any shape. Information describing a region which is an extraction target with respect to each dimension of a feature is called a feature parameter. Specifically, if each dimension of a feature vector is a feature extracted from a particular block within the screen image, information describing the particular block for extracting the feature (coordinate value of the block, index number of the block, and the like) serves as a feature parameter. In another case, if a local region in any of a variety of shapes corresponds to each dimension of a feature vector, information describing the local region (information indicating location, size, and shape of the local region) serves as a feature parameter.

The matching weight information extraction unit 610 calculates an amount of change of the image in a time direction in a region corresponding to each dimension of the feature by the feature extraction parameter, determines a weighting coefficient of each dimension to be used for matching in accordance with the amount of change, and outputs information describing the weighting coefficient as matching weight information.

This means that an amount of change is first calculated for each region using the current target picture and previous and next pictures. The amount of change may be an amount of change in a time direction of the image calculated by means of the method shown in FIG. 3, or an amount of motion calculated by means of the method shown in FIG. 7.

Next, according to the amount of change in a time direction calculated with respect to each dimension, information describing the degree of weighting for each dimension of the feature to be used for matching is determined. As a region having a larger change in a time direction has a higher possibility of contributing to discrimination of a video, weighting is performed such that a larger change is determined to be more important. For example, a degree of weighting may be determined by a function which monotonically increases with respect to an amount of change in a time direction. Matching weight information may be a coefficient itself which determines the degree of weighting, or may be information of index designating a class among classes formed by dividing the degrees of weighting from low to high. In a scene where an anchor person speaks in a news program, for example, there is a case where no motion is found in areas other than an area around the face of the anchor person. In that case, as a change in a time direction in the dimension of the region corresponding to the face of the anchor person becomes relatively larger than changes in other regions in the screen image, matching weight information, in which weight of the dimension of the feature corresponding to the face region (particularly, a region corresponding to the mouth and eyes) is high, is calculated.

It should be noted that the matching weight information may be calculated for each picture, or calculated for several pictures in a lump, and output. For example, if a portion with motion within a shot is limited to a particular region, it is possible to calculate and output matching weight information with respect to the entire shot. More specifically, it is possible that matching weight information, obtained for one picture in a shot, is also used for other pictures in the shot. Thereby, the amount of calculation of obtaining the matching weight information can be reduced, and also, the amount of information of the image signature can be reduced. Alternatively, it is possible to calculate matching weight information for all or a plurality of pictures in a shot and, with use of a representative value thereof (mean, median, or the like), describe matching weight of the entire shot and use it for all pictures in the shot. Thereby, the amount of information of the video signature can be reduced.

However, units for outputting matching weight information are not limited to shots, and may be fixed time intervals such as every several pictures. It is also possible to calculate time segments to which the same matching weight information is applicable from time direction variation information, and calculate and output matching weight information in a lump with respect to the pictures included in the time segments. In that case, as the number of pictures put together varies each time, the number of pictures is also described together. Time segments to which the same matching weight information is applicable are able to be calculated by applying threshold processing on changes in the time direction variation information between pictures. As such, time direction variation information in the head picture in a time segment and time direction variation information of the current picture are compared, and if the degree of change exceeds a threshold, a segment up to the previous picture is considered as one unit, whereby matching weight information with respect to such segment is calculated. The matching weight information with respect to such segment may be used as matching weight information of an arbitrary picture in the segment or a representative value of matching weight information of the pictures in the segment. Through these processes, regardless of a processing target video, the amount of information of the matching weight information can be reduced while keeping high discrimination accuracy in a time direction.

Further, if a plurality of dimensions of a feature vector correspond to the same region, they may be shown in a lump as one weight information. For example in the case of Edge Histogram set in ISO/IEC 15938-3, every five bins correspond to the same region. In that case, weight information may be described in a lump every five bins.

The multiplexing unit 620 multiplexes the change region information output from the time axial direction change region extraction unit 100, the each-region visual feature output from the each-region feature extraction unit 110, the each-picture visual feature output from the each-picture feature extraction unit 130, and the matching weight information output from the matching weight information extraction unit 610, and generates and outputs a video signature. The operation of the multiplexing unit 620 is similar to that of the multiplexing unit 120 shown in FIG. 1, except for multiplexing the matching weight information output from the matching weight information extraction unit 610.

Next, a matching device according to the second embodiment of the present invention will be described.

Figure 12:
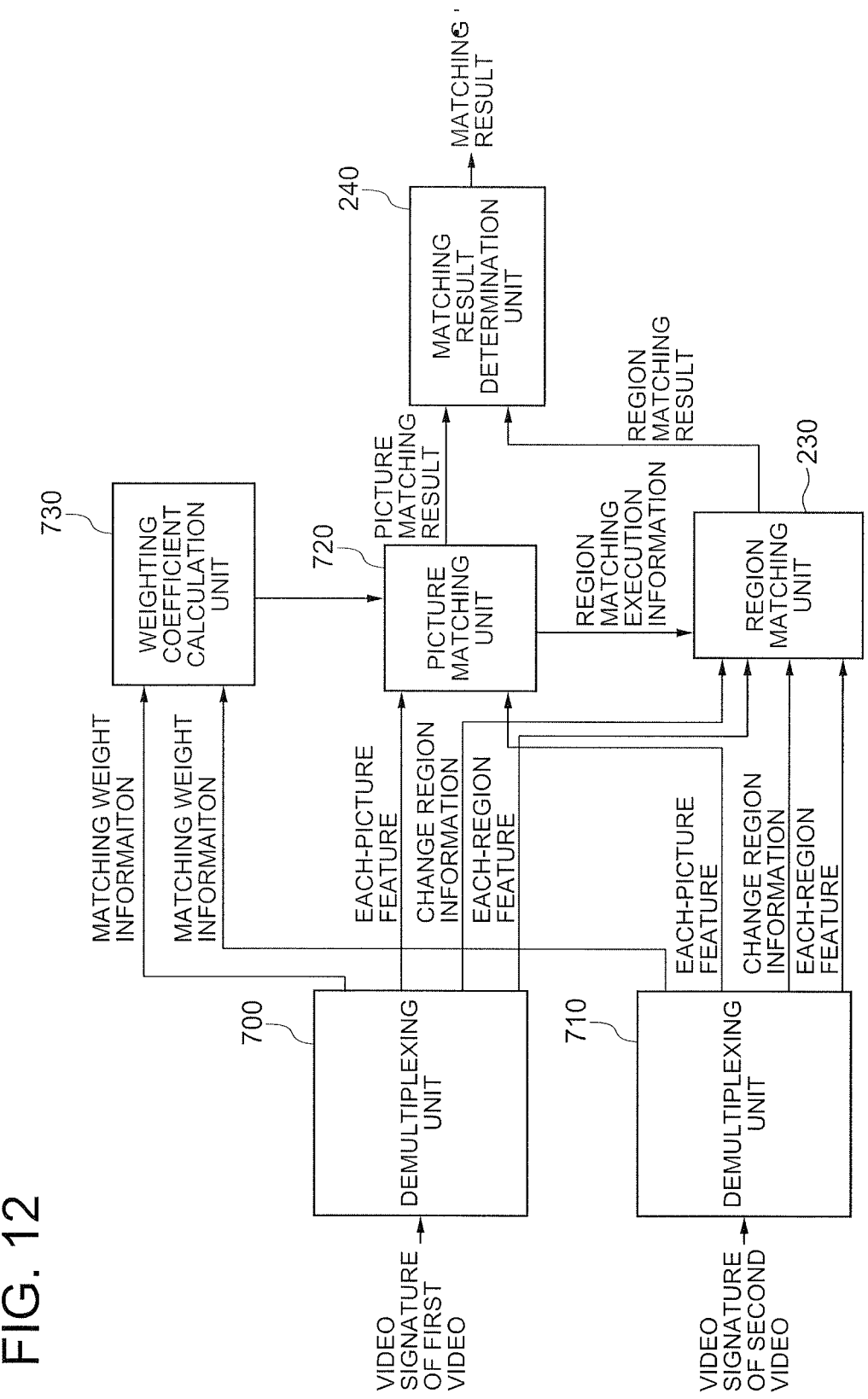
FIG. 12 is a block diagram showing an exemplary configuration of a video signature matching device for matching video signatures generated by the video signature extraction device of the second embodiment.

Referring to FIG. 12 showing a matching device for matching a video signature generated according to the second embodiment of the present invention, the matching device includes a demultiplexing unit 700, another demultiplexing unit 710, a picture matching unit 720, a weighting coefficient calculation unit 730, a region matching unit 230, and a matching result determination unit 240.

The demultiplexing unit 700 demultiplexes an input first video signature, outputs a first each-picture visual feature to the picture matching unit 720, outputs a first each-region visual feature and first change region information to the region matching unit 230, and outputs first matching weight information to the weighting coefficient calculation unit 730.

Similarly, the demultiplexing unit 710 demultiplexes an input second video signature, outputs a second each-picture visual feature to the picture matching unit 720, outputs a second each-region visual feature and second change region information to the region matching unit 230, and outputs second matching weight information to the weighting coefficient calculation unit 730. The weighting coefficient calculation unit 730 calculates a weighting coefficient from the first matching weight information output from the demultiplexing unit 700 and the second matching weight information output from the demultiplexing unit 710, and outputs the weighting coefficient to the picture matching unit 720. The picture matching unit 720 uses the weighting coefficient output from the weighting coefficient calculation unit 730 to compare the first each-picture visual feature output from the demultiplexing unit 700 with the second each-picture visual feature output from the demultiplexing unit 710, and outputs a picture matching result to the matching result determination unit 240, and outputs region matching execution information to the region matching unit 230. Based on the region matching execution information output from the picture matching unit 720, the first change region information output from the demultiplexing unit 700, and the second change region information output from the demultiplexing unit 710, the region matching unit 230 compares the first each-region visual feature output from the demultiplexing unit 700 with the second each-region visual feature output from the demultiplexing unit 710 and outputs a region matching result to the matching result determination unit 240. The matching result determination unit 240 calculates a matching result from the picture matching result output from the picture matching unit 720 and the region matching result output from the region matching unit 230, and outputs the matching result. It should be noted that the matching device of the present embodiment can be realized by a computer which is controllable by programs.

Next, operation of the matching device shown in FIG. 12 will be described.

Operation of the demultiplexing unit 700 is almost similar to that of the demultiplexing unit 200 shown in FIG. 8, but also separates first matching weight information from the first video signature. Similarly, operation of the demultiplexing unit 700 is almost similar to that of the demultiplexing unit 210 shown in FIG. 8, but also separates second matching weight information from the second video signature. The separated first matching weight information and the second matching weight information are input to the weighting coefficient calculation unit 730.

The weighting coefficient calculation unit 730 calculates a weighting coefficient with respect to each dimension of the feature, from the first matching weight information and the second matching weight information. A plurality of methods may be used for calculating a weighting coefficient from the first matching weight information and the second matching weight information, if the calculated weighting coefficient satisfies conditions such that it becomes smaller when both pieces of matching weight information correspond to a smaller weight value and it increases when at least one of weight values corresponding to the matching weight information increases. For example, if respective weights calculated from the first matching weight information and the second matching weight information are $w_1(i)$ and $w_2(i)$, a weighting coefficient $w(i)$ is calculated from the following Expression 7.

$$w(i) = \max(w_1(i), w_2(i)) \quad \text{[Expression 7]}$$

More generally, the following Expression 8 may be used.

$$w(i) = |w_1(i)^p + w_2(i)^p|^{1/p} \quad \text{[Expression 8]}$$

In Expression 8, p represents any natural number, and when p is infinite, the expression results in Expression 7.

The weight coefficient is calculated for each dimension of the feature, and is output to the picture matching unit 720.

While the operation of the picture matching unit 720 is basically similar to that of the picture matching unit 220 shown in FIG. 8, except for an aspect of using a weight coefficient calculated as described above when performing matching between feature vectors.

In that case, the features may be compared using the degree of similarity showing similarity between them, or using a distance showing the degree of difference between them. In the case of using a distance, comparison is made using a distance d calculated according to Expression 9, rather than Expression 3.

$$d = \sum_{i=1}^{N} w(i)|v_1(i) - v_2(i)| \quad \text{[Expression 9]}$$

In Expression 9, w(i) represents a weight coefficient corresponding to the $i^{th}$ dimension. Similarly, in the case of using a degree of similarity, Expression 10 and Expression 11 are used, rather than Expression 4 and Expression 6.

$$S = \sum_{i=1}^{N} w(i) Sim(v_1(i), v_2(i)) \quad \text{[Expression 10]}$$

$$S = \frac{\sum_{i=1}^{N} w(i) v_1(i) v_2(i)}{\sqrt{\sum_{i=1}^{N} w(i) v_1(i)^2 \sum_{i=1}^{N} w(i) v_2(i)^2}} \quad \text{[Expression 11]}$$

Operation of the region matching unit 230 and operation of the matching result determination unit 240 are similar to those of the case shown in FIG. 8.

[Effects of Second Embodiment]

According to the present embodiment, matching accuracy in a time direction can be improved, compared with the first embodiment. This is because by increasing the weight of the feature corresponding to a region where a change such as motion or a luminance change is caused in the image, matching is less affected by a feature change due to coding distortion or the like. For example, it is assumed that a scene in which an anchor person reads the news in a studio consists of two pictures A and B, and that a difference between the pictures A and B is only the mouth of the anchor person and the others are completely same. When a picture C, which is completely the same as the picture A is given and it is mechanically determined to which of the pictures A and B the picture C is similar, if there is no coding distortion, a distance between the picture C and the picture A is zero. On the other hand, regarding a distance between the picture C and the picture B, as a weight of a mouth portion with motion is large, the distance is sufficiently large. Now, considering that coding distortion exists in the background part of the picture A, for example, although the distance between the picture C and the picture A becomes large due to the coding distortion, as the weight of the background part with no motion is small, the distance between the picture C and the picture A will never be larger than the distance between the picture C and the picture B.

Next, a third embodiment of the present invention will be described.

Figure 13:
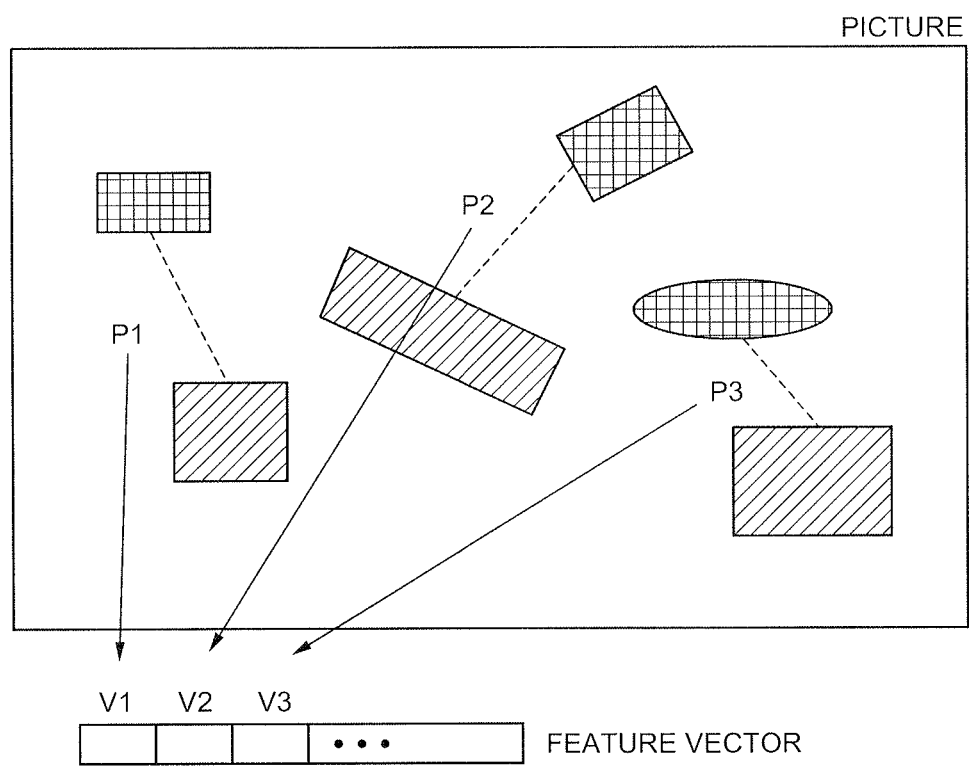
FIG. 13 is an illustration showing an example of a feature.
Figure 14:
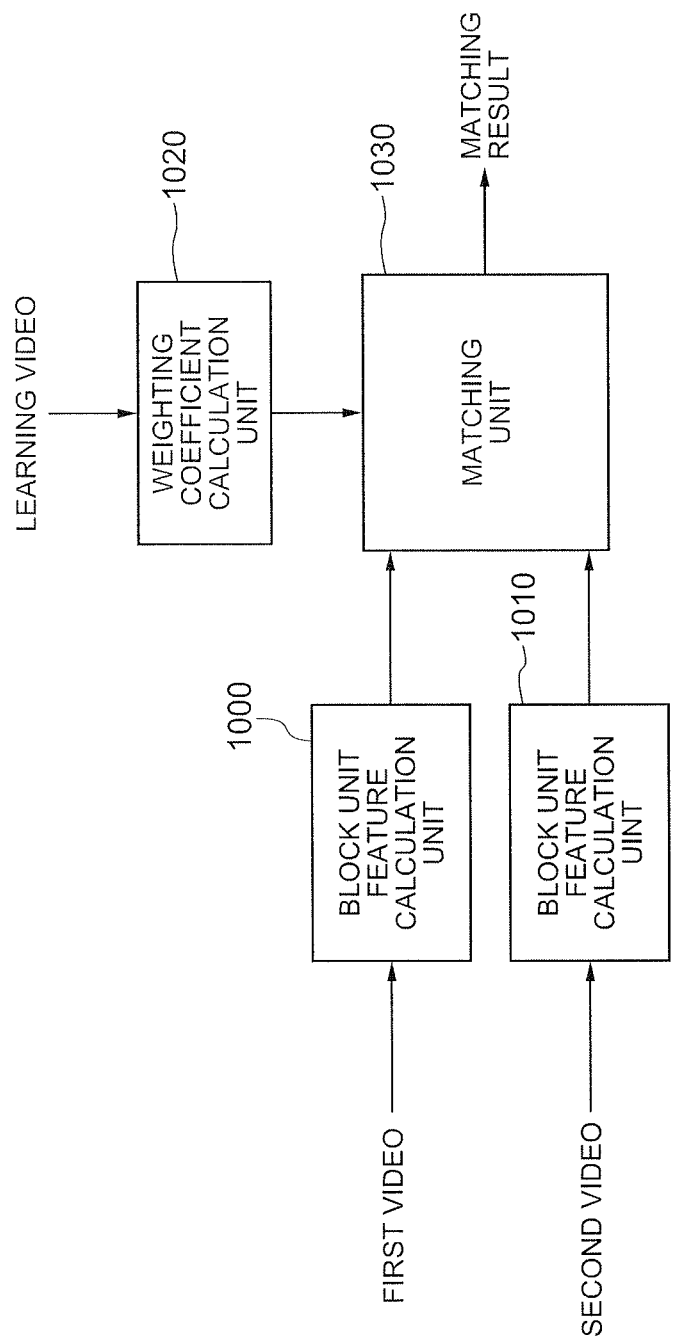
FIG. 14 is a block diagram for explaining related art of the present invention.

FIG. 13 shows an exemplary method of extracting features from a picture. In this method, pairs of any two regions within a picture are set beforehand, and a difference between the features of the two regions of a pair is obtained as a feature vector. In this embodiment, respective pairs of regions are indicated as P1, P2, P3, . . . , and a feature determined from the $n^{th}$ pair is indicated as Vn. Pairs of regions may take various combinations of shapes and positions of regions, as shown in FIG. 13. Also, various methods can be used for calculating a feature Vn from the pair Pn. For example, there is a method in which a mean value of luminance is calculated in each of a shaded region and a reticulated region of a pair, and a value of the feature Vn is determined from the magnitude relation thereof. Specifically, a mean luminance value obtained within a reticulated region is subtracted from a mean luminance value obtained within a shaded region to calculate a difference, and when the difference is positive, Vn=1, while when the difference is negative, Vn=−1. It is also possible that if the absolute value of the difference is smaller than a threshold, Vn is zero, so that the feature Vn is indicated by three values. It should be noted that another representative value can be used, instead of the mean luminance value. For example, a median value within a region or a value corresponding to the top a % of the luminance values in descending order may be used, or an amount showing the edge feature may be used as a representative value. For example, it is possible to apply a filter for detecting an edge to a region, and perform statistical processing such as averaging from the result to obtain a representative value.

The time axial direction change region extraction unit 100 calculates a change in the screen image in a time direction, with respect to each region formed by dividing it into MSN pieces (M and N represent natural numbers). For this calculation, Expressions 1 and 2 can be used. A region having a large amount of change in a time direction is selected, and an index of the region is output as change region information. As methods for selecting such a region, selecting a region when an amount of change in a time direction is not less than a given threshold, or selecting a given number of regions from the top when the regions are arranged in descending order of the amount of change, may be used.

It should be noted that if there are a large number of regions having large amount of change, discrimination can often be made only using the entire picture. In that case, it is possible not to calculate a feature in a region unit. For example, if the number of regions having small amount of change is not more than a certain threshold, a feature in a region unit is not calculated. As such, nothing is output as change region information, or change region information may include information showing there is no feature extraction target region.

The obtained change region information is output to the each-region feature extraction unit 110. The each-region feature extraction unit 110 extracts a feature of each region with respect to a region designated by the change region information output from the time axial direction change region extraction unit. As this feature, one similar to that calculated with respect to the entire picture can be used. As such, as shown in FIG. 13, any two regions within a picture are set as a pair, and a difference between the features of the pair of two regions is obtained as a feature vector. A method of setting a pair in this process and a method of calculating a representative value in a region may be the same as those used for the entire picture, or different. Further, a method of calculating a feature may be changed for each region.

As described above, even in a scene having less temporal change, it is possible to construct features with which video segments can be discriminated in a time axial direction with high accuracy.

While the embodiments of the present invention have been described above, the present invention is not limited to these examples. It will be understood by those of ordinary skill in the art that various changes in form and details may be made therein without departing from the scope of the present invention.

This application is based upon and claims the benefit of priority from Japanese patent application No. 2009-12815, filed on Jan. 23, 2009, the disclosure of which is incorporated herein in its entirety by reference.

INDUSTRIAL APPLICABILITY

The present invention is applicable to retrieval of similar or identical videos from various videos with high accuracy. In particular, regarding retrieval of the same segments of videos, the present invention is applicable to identification of illegally copied moving images distributed on the networks and identification of commercials distributed on actual airwaves.

REFERENCE NUMERALS 100 time axial direction change region extraction unit
110 each-region feature extraction unit
120, 620 multiplexing unit
130, 630 each-picture feature extraction unit
200, 210, 700, 710 demultiplexing unit
220, 720 picture matching unit
230 region matching unit
240 matching result determination unit
400 inter-picture difference calculation unit
410 change region extraction unit
500 motion information calculation unit
510 change region extraction unit
610 matching weight information extraction unit
730 weighting coefficient calculation unit

The invention claimed is:

1. A video signature extraction device, comprising:
a memory storing computer program instructions; and
one or more computer processors configured to process the computer program instructions to:
extract a first feature as an each-picture visual feature from a first picture, among a plurality of pictures each of the plurality of pictures being a frame or a field of an input video;
calculate an image change value in a time direction for each of a plurality of regions included in the first picture, among the plurality of pictures;
obtain one or more change regions having the image change value greater than a predetermined threshold among the each of the plurality of the regions;
generate change region information which designates the obtained one or more change regions;
extract a second feature as an each-region visual feature from each of the one or more change regions designated by the change region information; and
extract a video signature including the each-picture visual feature, the each-region visual feature, and the change region information.

2. The video signature extraction device, according to claim 1, wherein the one or more computer processors configured to process the instructions to:

calculate an inter-picture pixel value difference between the first picture for which the change region information is generated and a second picture, which is a previous or a next picture, and generate the change region information based on the inter-picture pixel value difference.

3. The video signature extraction device, according to claim 1, wherein the one or more computer processors configured to process the instructions to:

perform motion estimation processing between the first picture for which the change region information is generated and a second picture, which is a previous or next picture, and generate the change region information based on a degree of magnitude of an estimated motion.

4. A video signature extraction method, comprising:

extracting, by one or more computer processors, a first feature as an each-picture visual feature from a first picture, among a plurality of pictures each of the plurality of pictures being a frame or a field of an input video;

calculating, by the one or more computer processors, an image change value in a time direction for each of a plurality of regions included in the first picture, among the plurality of pictures;

obtaining, by the one or more computer processor, one or more change regions having the image change value greater than a predetermined threshold among the each of the plurality of the regions;

generating, by the one or more computer processors, change region information which designates the obtained one or more change regions;

extracting, by the one or more computer processors, a second feature as an each-region visual feature from each of the one or more change regions designated by the change region information; and extracting, by the one or more computer processor, a video signature including the each-picture visual feature, the each-region visual feature, and the change region information.

5. A non-transitory computer-readable medium having stored thereon computer program instructions to cause one or more computer processors to:

extract a first feature as an each-picture visual feature from a first picture, among a plurality of pictures each of the plurality of pictures being a frame or a field of an input video;

calculate an image change value in a time direction for each of a plurality of regions included in the first picture, among the plurality of pictures;

obtain one or more change regions having the image change value greater than a predetermined threshold among the each of the plurality of the regions;

generate change region information which designates the obtained one or more change regions;

extract a second feature as an each-region visual feature from each of the one or more change regions designated by the change region information; and extract a video signature including the each-picture visual feature, the each-region visual feature, and the change region information.

* * * * *